United States Patent Office 3,238,662
Patented Mar. 8, 1966

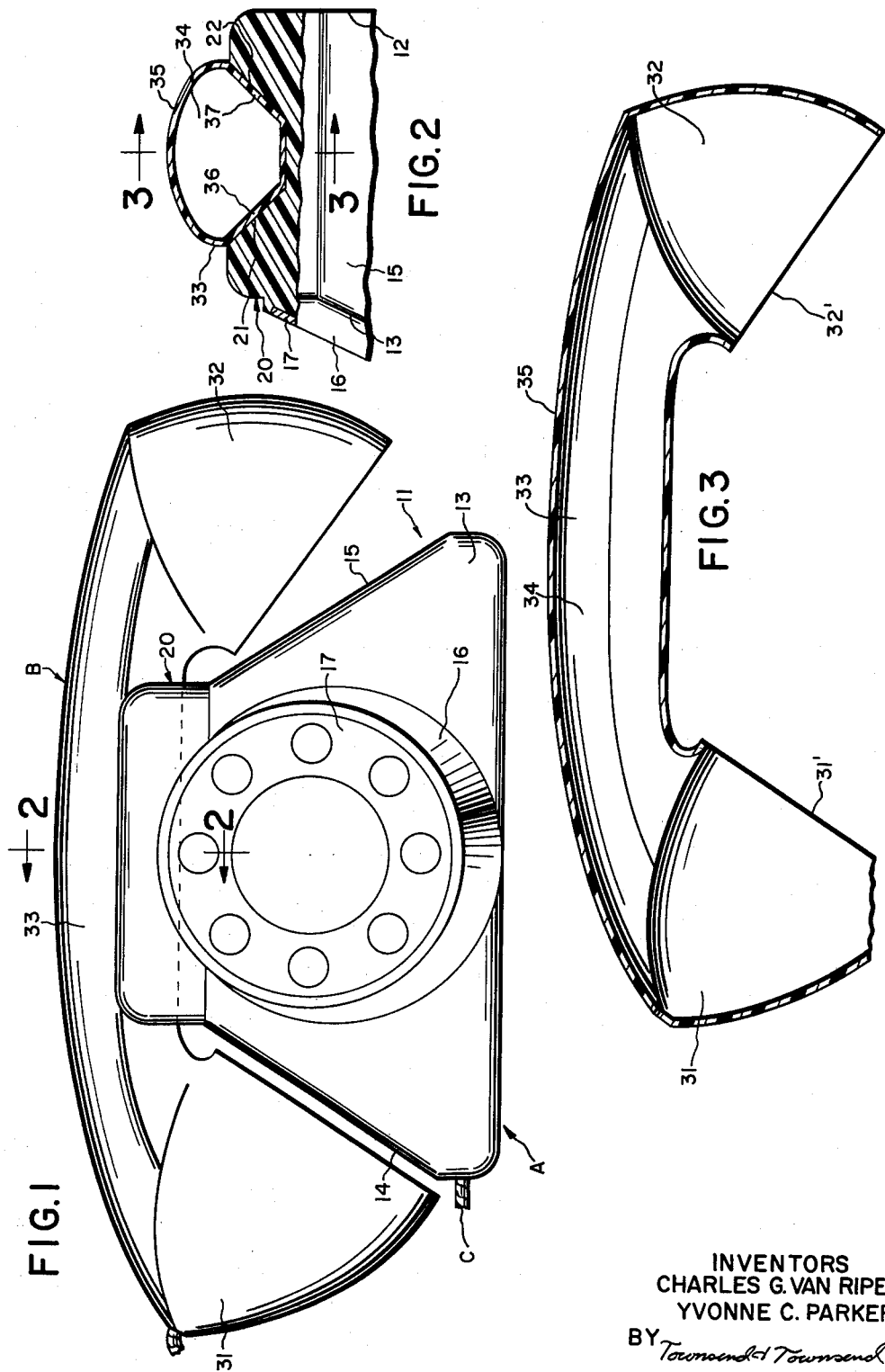

3,238,662
TOY TELEPHONE USABLE FOR SPEECH TRAINING
Charles G. Van Riper, Kalamazoo, and Yvonne C. Parker, Fremont, Mich., assignors to Gerber Products Company, Fremont, Mich.
Filed Mar. 26, 1963, Ser. No. 274,368
1 Claim. (Cl. 46—33)

The present invention relates in general to a telephone toy useful in speech correction and teaching.

Toy telephones constructed to resemble an actual telephone have been produced in the past for the amusement of infants and small children. These toys have suffered from several shortcomings, the most important of which is the strength of the handle portion of the telephone.

According to the present invention to be described hereinafter in greater detail a toy telephone is provided having a base member, a handle member and means for attaching the handle member to the base member so that the handle member can be removably positioned on top of the base member. The handle member is made up of a hollow, bell-shaped mouthpiece provided with a speaking opening, a hollow, bell-shaped earpiece provided with a listening opening, and a hollow, tubular grip portion connected at one end to the mouthpiece and at the other end to the earpiece and providing a substantially unobstructed communication passageway from the mouthpiece to the earpiece.

The telephone according to this invention has a number of advantages. The handle portion is extremely rigid, the tubular grip portion providing rigid connection between the mouthpiece and the earpiece. Furthermore, and a very important feature of the present invention, the grip portion provides therewithin a hollow substantially unobstructed communication passageway between the mouthpiece and the earpiece which serves as an effective communication channel for transmitting the user's voice sounds from the user's mouth to the user's ear and provides a desirable resonant structure for accomplishing this sound transmission. Thus, this handle member enables the user to distinctly hear the voice sounds being made and serves as a speech teaching and speech correction device. This feature and advantage of this invention is an extremely valuable asset for a small child's or infant's toy for these users are at an age at which they are learning to speak and are establishing their speaking habits and at which age speech difficulties can best be corrected.

Additionally, the communication path through the handle member from the mouthpiece to the earpiece is substantially entirely unobstructed by any baffles or mouthpiece or earpiece covers which would distort the transmission of sound through the handle member and partially defeat the speech learning and speech corrective features of the telephone.

Also, the planes of the speaking and listening openings into the mouthpiece and the earpiece, respectively are arranged at substantially right angles to one another so that when the telephone is used, the mouthpiece will substantially cover the user's mouth to pick up all sounds uttered.

Furthermore, the top portion of the base member is provided with inwardly directed surfaces inclined with respect to one another to form a handle receiving channel, and the handle member is provided in the central part of the grip portion with similarly inclined side surfaces so that the handle conveniently nests in the channel provided on the top of the base member when not in use.

Other objects of the present invention will become apparent upon reading the following specification and referring to the accompanying drawings in which similar characters of reference represent corresponding parts in each of the several views.

In the drawings:

FIG. 1 is a front view of the telephone toy according to the present invention;

FIG. 2 is a side view, partially broken away along the line 2—2 in FIG. 1; and

FIG. 3 is a cross-sectional view of just the handle member taken along line 3—3 of FIG. 2 and partially broken away.

Referring now to the drawing, the telephone toy according to the present invention includes a base member A, a handle member B, and a cord C which attaches the handle member to the base member so that the handle member can be removed from the base member and utilized by a person without disturbing the base member.

The base member includes a truncated pyramid structure having a substantially vertical back surface 12, a front surface 13 slightly inclined to the vertical and inclined side surfaces 14 and 15 joining the back and front surfaces 12 and 13 respectively.

The front surface 13 is provided with a raised dial portion 16 which has a recessed circular dial face in which is inserted a facsimile of a telephone dial which may conveniently be in the form of a gummed label.

The top of the base member A is provided with a cradle portion 20 having a channel which extends from one side surface to the other and formed by inwardly tapering side surfaces 21 and 22.

The handle member is made up of a hollow, bell-shaped mouthpiece member 31, a similar hollow, bell-shaped earpiece member 32 and a hollow, tubular grip portion 33 connecting the mouthpiece 31 to the earpiece 32. Speaking and listening openings 31' and 32' are respectively provided in the base of the bell-shaped members 31 and 32. The grip portion 33 provides a substantially entirely unobstructed communication passageway 34 which provides communication only between the mouthpiece 31 and the earpiece 32. This communication passageway 34 along with the mouthpiece 31 and earpiece 32 provide a resonant type structure for transmitting undistorted voice sounds from the user's mouth to his ear. Thus there are no mouthpiece and earpiece plates covering the openings 31' and 32' in the mouthpiece 31 and earpiece 32.

The grip portion 33 is connected to the mouthpiece 31 and the earpiece 32 respectively in such a manner that the planes of the speaking and listening openings 31' and 32' respectively, are arranged substantially perpendicular to one another. In this manner, with the earpiece 32 positioned against the user's ear, the opening 31' in the mouthpiece 31 will be arranged so as to substantially cover the user's mouth in order to pick up all the sounds uttered.

The grip portion 33 of the handle member B is provided with an upper, rounded surface 35 and two lower tapered sides 36 and 37 inclined with respect to one another at the same angle as the inwardly tapering side surfaces 21 and 22 on the base member A. By this construction, the handle member B nests in the channel of the cradle portion 20 on top of the base member A.

A telephone toy according to the present invention is conveniently constructed out of hard plastic and the handle member B can either be molded with mouthpiece and earpiece covers and have these covers cut away or blow-molded formed with the openings 31' and 32' initially provided in the mouthpiece 31 and earpiece 32.

Although the foregoing invention has been described in some detail by way of illustration and example for purposes of clarity of understanding, it is understood that certain changes and modifications may be practiced within the spirit of the invention as limited only by the scope of the appended claim.

What is claimed is:

A telephone toy including: a base member having inwardly tapering side surfaces forming a channel on the top thereof; a handle member; and means for connecting said base member to said handle member whereby said handle member may be removably positioned in the channel on the top of said base member; said handle member including a hollow, bell-shaped mouthpiece with the base of the bell entirely open providing a speaking opening; a hollow, bell-shaped earpiece with the base of the bell substantially entirely open providing a listening opening; and a hollow, tubular grip portion connected at one end to said mouthpiece, connected at the other end to said earpiece, and providing a substantially unobstructed communication passageway between said mouthpiece and said earpiece with the planes of said speaking opening and said listening opening positioned perpendicular to one another, said grip portion provided with tapered sides inclined at the same angle as said tapered side surfaces forming said channel on the top of said base member whereby said handle sides nest within said channel against said base side surfaces for positioning said handle on top of said base member.

References Cited by the Examiner

UNITED STATES PATENTS

| D. 193,343 | 8/1962 | MacFarlane. | |
| 1,494,019 | 5/1924 | Rasmussen. | |
| 2,475,303 | 7/1949 | Allen et al. | 179—100 XR |
| 2,530,556 | 11/1950 | Turnbull | 179—103 |
| 2,607,857 | 8/1952 | Baker | 179—103 |
| 2,633,769 | 4/1953 | Saks | 46—33 XR |
| 3,098,307 | 7/1963 | Caldwell | 35—35 |
| 3,182,746 | 5/1965 | Schaefer | 35—35 |

FOREIGN PATENTS

| 674,587 | 6/1952 | Great Britain. |
| 214,420 | 7/1941 | Switzerland. |

RICHARD C. PINKHAM, *Primary Examiner.*